Dec. 31, 1935.  F. I. GETTY  2,025,979
CIRCUIT CLOSER FOR STEERING WHEELS
Filed Oct. 3, 1933  2 Sheets-Sheet 1
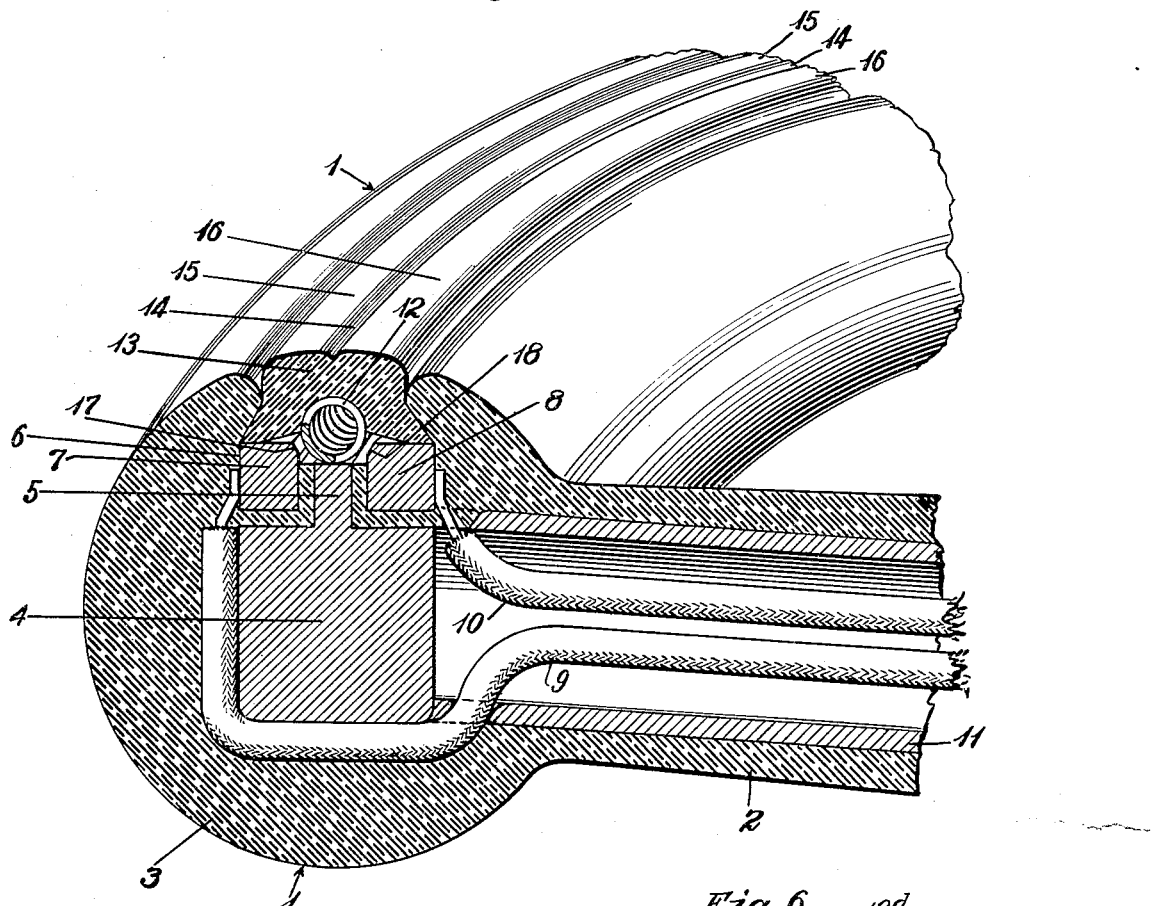
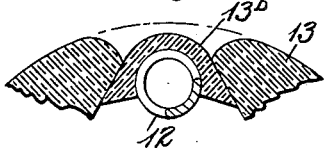
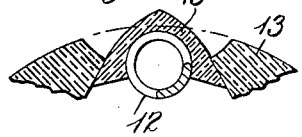
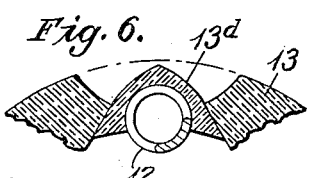
Inventor
Fred I. Getty
By Brown & Phelps
Attorney

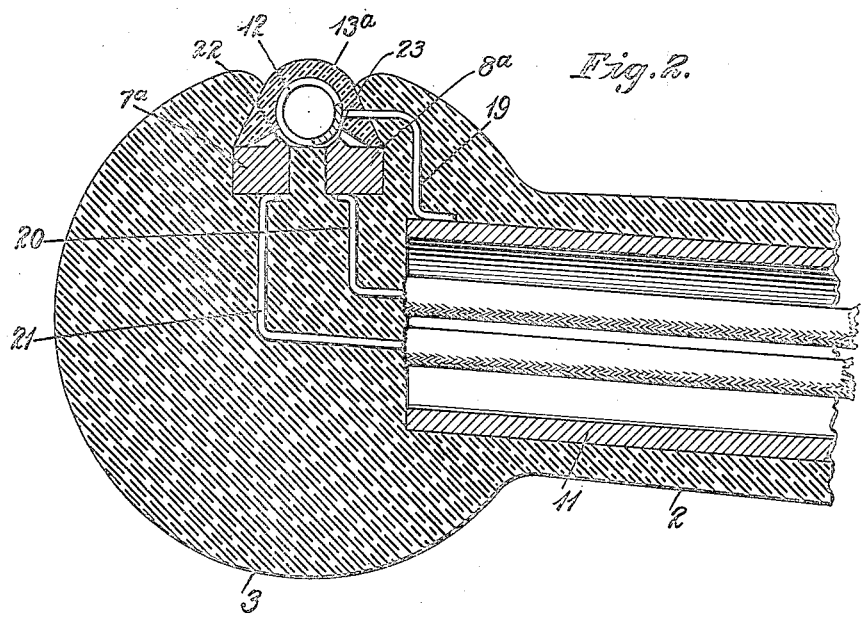
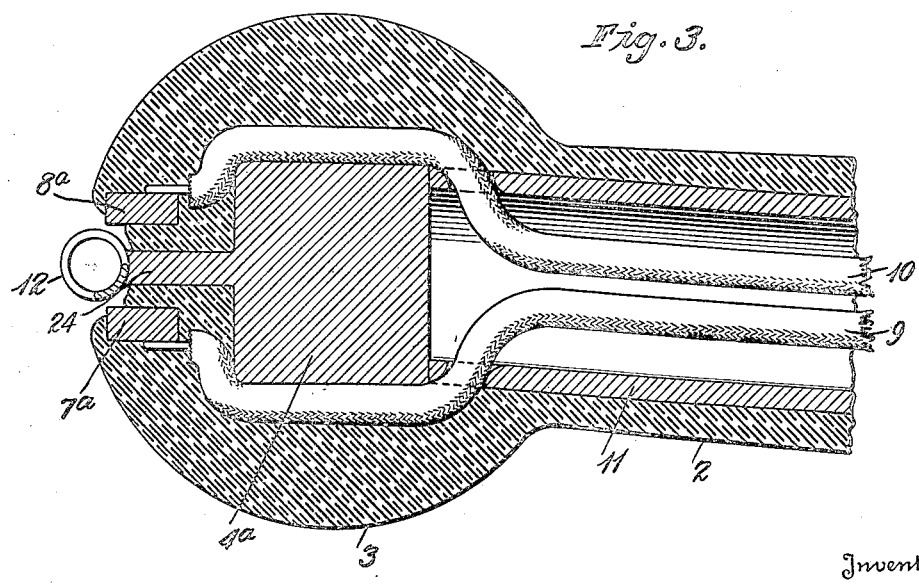

Patented Dec. 31, 1935

2,025,979

UNITED STATES PATENT OFFICE 2,025,979

CIRCUIT CLOSER FOR STEERING WHEELS

Fred I. Getty, Jennings, La.

Application October 3, 1933, Serial No. 691,987

9 Claims. (Cl. 200—59)

The invention relates to circuit closers for steering wheels and has as an object the provision of a steering wheel provided with a circuit closer which by a single element may control a plurality of electrically actuated accessories of the vehicle.

It is a further object of the invention to provide circuit closing means adapted to actuate two circuits with a minimum of operating parts.

It is a further object of the invention to provide circuit closing means adapted to bridge either of two circuits by means of a single bridging element.

Further objects of the invention will appear from the following description when read in connection with the accompanying drawings showing an illustrative embodiment of the invention, and wherein:

Fig. 1 is a detailed perspective view partly in section of the rim of a steering wheel equipped with the invention, and a portion of one spoke thereof;

Figs. 2 and 3 are transverse vertical sections of the rim and a portion of the spoke of the steering wheel showing modified forms of the invention; and Figs. 4, 5, and 6 are detailed transverse sections respectively of a portion of the steering wheel rim showing modified forms of the compressible resilient enclosure for the recess in the wheel with the helical contact-making member associated therewith.

As shown the device comprises a steering wheel, a fragment of which is shown at 1 having a plurality of spokes, a fragment of one of which is shown at 2 centered at a hub (not shown).

The rim 3 of wheel 1 may be formed of hard rubber or other suitable material containing a metallic core 4 formed with an annular flange 5, the upper portion of which is exposed in an annular recess 6 formed in the covering of rim 3.

As shown the rim of the wheel also comprises two annular conducting rings 7 and 8 insulated from flange 5, core 4, and spoke 2. Insulated wires 9 and 10 lead from rings 7 and 8 respectively through spoke 2, which is shown as formed with a hollow metallic core 11 affixed to and in electrical contact with core 4 of the rim. The wires 9 and 10 are connected with a desired accessory each, not shown, which accessories may be connected to a grounded battery. The wires 9 and 10 may be run through any desired spoke or separated and run through different spokes.

A bridging member 12, preferably in the form of a band of helically wound wire substantially continuous throughout the rim of the wheel, is provided to close the circuit between core 4 through annular flange 5 and the conducting rings 7 or 8 as desired.

To close the annular recess 6 and to provide controlling means for the bridging member 12, a closure 13 of resilient material such as sponge or soft rubber is provided.

The closure 13 is adapted to yield upon the application of pressure at any circumferential point of its perimeter, and is kept in continuous fixed relationship with bridging member 12 by any suitable means, as for example embedding the upper portion of the helix in the matter composing closure 13, in such manner that any motion imparted to closure 13 is imparted to bridging member 12.

Closure 13 is retained in annular recess 6 by any suitable means, such as undercutting the walls of recess 6 and shaping the edges of closure 13 in conformity therewith, and in Fig. 1 is shown as partially surrounded by the covering 3 of the wheel. Closure 13 is provided with a crevice 14 defining beads 15 and 16 at each side thereof, pressure upon either of which is designed to close a corresponding circuit.

Beads 15, 16 are provided for the purpose of guiding the fingers of the operator of the vehicle to a proper position to close a desired circuit; as for example, pressure applied to any circumferential point of bead 15 will cause a corresponding portion bridging member 12 to slide or roll laterally into contact with annular conducting ring 8 closing the circuit between annular flange 5 and ring 8. Similarly, pressure upon bead 16 will cose the circuit between flange 5 and ring 7.

For the purpose of making better contact with bridging member 12, the corners 17 and 18 of rings 7 and 8 respectively are cut away.

As shown in Fig. 2, the rim 3 of the wheel is made up largely of insulating material, as hard rubber, and the contact rings 7a, 8a, are insulated from each other by the material of the rim and are adapted to be connected by wires 20, 21 passing through the hollow spoke to the individual accessories to be controlled, the rings 7a, 8a thus being individual to the circuits of the said accessories (not shown).

The rings 7a, 8a are shown as formed with ridges 22, 23, and when the helical member 12 is displaced by pressure upon an appropriate portion of the closure 13a, at either side of the center thereof, the circuit will be closed by the wire 19 in contact with metallic portion 11 of the spoke and the appropriate wire 20 or 21.

In the form of Fig. 3 the portion 24 of the core 4a is directed toward the outside periphery of the rim and is made concave, as shown, in which concavity the helical spring band 12 seats, being thus retained in central position by the resilience of the band 12 which is slightly stretched when placed in position in the wheel. Therefore, when the band 12 is pressed laterally in either direction it will cause a bridge between the core 4a and the ring 7a or 8a, depending upon which direction it is displaced from the central position and will return to said central position by reason of the contractile force of the band 12.

In Figs. 4, 5, and 6 are shown modified forms of the closure member 13. In Fig. 4 the closure member 13b, desirably formed of material of the nature of sponge rubber, has a single rounded upper portion as distinguished from the two beads 15, 16 of Fig. 1, the crest of the member 13b lying below the circle of the surface of the steering wheel rim, as indicated by the dot and dash lines in said figure.

In Figs. 5 and 6 the crest of the closure 13c or 13d is made sharp to better locate the pressure to be applied thereto in a direction laterally of the closure. In Fig. 5 the crest rises above the general curve of the rim, and in Fig. 6 is located below the same, the recess in the wheel at each side of the closure being slightly enlarged for better application of pressure thereto by a finger or thumb of the user.

The form of closure 13a of Fig. 2 is similar to that of Fig. 4 but the crest thereof lies in the curve of the rim of the wheel as extended across the recess.

It is obvious from the drawings that the invention as disclosed in Figs. 1 and 2 could be duplicated on the under side of the wheel, on the external circumference thereof, or both and thus multiply the number of accessories actuated thereby.

Minor changes may be made in the physical embodiment of the invention within the scope of the appended claims without departing from the spirit thereof.

I claim:

1. A circuit closer for steering wheels comprising in combination: a wheel rim having a recess; a contact member common to a plurality of circuits exposed in said recess; a plurality of contact members, each individual to one of said circuits and exposed in said recess; a common bridging member housed in said recess; compressible resilient closure means for said recess, holding said bridging member in central position out of circuit closing position; pressure upon said means at an off center point operable to force said bridging member into a bridging relation with said common contact member and a desired individual contact member.

2. A circuit closed for steering wheels comprising, in combination: a wheel rim having an annular recess; a contact ring common to two circuits exposed in said recess; a plurality of contact rings continuous about the circumference of the wheel rim, also exposed in said recess; a common bridging member housed in said recess; compressible resilient closure means for said recess, holding said bridging member in central position out of circuit closing position; pressure upon said means at an off center point operable to force said bridging member into a bridging relation with said common contact member and a desired individual contact member.

3. A circuit closer for steering wheels comprising, in combination: a rim having a recess; a contact member common to a plurality of circuits exposed in said recess; a plurality of contact members each individual to one of said circuits also exposed in said recess; a common bridging member comprising a helically wound wire; a compressible resilient closure for said recess also comprising means for holding said bridging member in a central position out of circuit closing position; pressure upon said means at an off center point operable to force said bridging member into bridging relation with said common contact member and a desired individual contact member.

4. A circuit closer for steering wheels comprising, in combination: a wheel rim comprising a metallic core common to a plurality of circuits, and a non-metallic covering for said core having a recess therein; said core exposed in said recess; a plurality of contact members each individual to one of said circuits also exposed in said recess; a common bridging member in said recess normally out of circuit closing relation; pressure upon said bridging member at an off-center point operable to force said bridging member into bridging relation with said core and a desired individual contact member.

5. A circuit closer for steering wheels comprising, in combination: a wheel rim comprising a flanged metallic core common to a plurality of circuits, and a non-metallic covering for said core having a recess therein; the flange of said core exposed in said recess; a plurality of contact members partially embedded in said covering in an angle formed between said flange and the body of said core and partially exposed in said recess; a common bridging member in said recess normally in central position out of circuit closing relation; pressure upon said bridging member at an off-center point operable to force said bridging member into bridging relation with said core and a desired individual contact member.

6. A circuit closer for steering wheels comprising, in combination: a wheel rim comprising a contact ring common to a plurality of circuits, and a plurality of metallic contact rings each individual to one of said circuits; each of said rings substantially equidistantly spaced at all points from said common contact member; a common bridging member normally out of circuit closing position; said member movable into bridging relation with said common contact member and a desired individual contact member.

7. A circuit closer for steering wheels comprising, in combination: a steering wheel rim comprising a metallic core, and a covering for said core of non-metallic material formed with an annular recess in which said core is exposed; a plurality of annular contact rings also exposed in said recess and insulated from said core; a bridging member comprising a helically wound wire in said recess; a compressible resilient closure for said recess, said bridging member partially embedded in said closure and normally held thereby centrally out of circuit closing relation; pressure upon any circumferential point of said compressible closure operable to force said bridging member into bridging relation with said metallic core and either of said annular rings thereby closing a desired circuit.

8. A circuit closer for steering wheels comprising, in combination: a non-metallic wheel rim having a recess therein; a plurality of annular conducting rings each individual to a circuit exposed in said recess; a metallic member common to all of said individual circuits normally in central position in said recess; said member operable upon the application of selective off-center pressure to contact any chosen one of said rings and thereby close a circuit.

9. A circuit closer for steering wheels comprising, in combination: a wheel rim having a recess and comprising a plurality of contact members each individual to one of a plurality of circuits and exposed in said recess; a movable member common to all of the said circuits; compressible resilient closure means for said recess and for holding said contact member out of circuit closing position; pressure upon said means at an off-center point operable to force said member into contact relation with a desired individual contact member and thereby close the corresponding circuit.

FRED I. GETTY.